US011283864B2

(12) United States Patent
Devshatwar et al.

(10) Patent No.: US 11,283,864 B2
(45) Date of Patent: Mar. 22, 2022

(54) CLUSTER SYSTEM WITH FAIL-SAFE FALLBACK MECHANISM

(71) Applicant: TEXAS INSTRUMENTS INCORPORATED, Dallas, TX (US)

(72) Inventors: Nikhil Nandkishor Devshatwar, Bangalore (IN); Shravan Karthik, Bangalore (IN); Santhana Bharathi N, Tamil Nadu (IN); Subhajit Paul, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/032,009

(22) Filed: Sep. 25, 2020

(65) Prior Publication Data

US 2021/0014305 A1 Jan. 14, 2021

Related U.S. Application Data

(63) Continuation of application No. 16/107,438, filed on Aug. 21, 2018, now Pat. No. 10,798,162.

(30) Foreign Application Priority Data

Aug. 28, 2017 (IN) .............................. 201741030266

(51) Int. Cl.
*H04L 29/08* (2006.01)
*G06F 11/07* (2006.01)
(Continued)

(52) U.S. Cl.
CPC ............ *H04L 67/1034* (2013.01); *G06F 9/50* (2013.01); *G06F 11/0793* (2013.01);
(Continued)

(58) Field of Classification Search
CPC . H04L 67/1034; H04L 12/402; H04L 43/045; H04L 43/0817; H04L 43/0852;
(Continued)

(56) References Cited

U.S. PATENT DOCUMENTS

7,289,125 B2  10/2007  Diard et al.
7,777,748 B2   8/2010  Bakalash et al.
(Continued)

*Primary Examiner* — Sargon N Nano
(74) *Attorney, Agent, or Firm* — Brian D. Graham; Charles A. Brill; Frank D. Cimino (57) ABSTRACT

A fail-safe system for a cluster application is disclosed. The system includes a first subsystem comprising a graphic processing unit (GPU) that executes a high-level operating system renders a first set of parameter data, and a second subsystem that executes a real-time operating system and renders a second set of parameter data. The system also includes a controller area network connected to a parameter data source input and to the first subsystem and the second subsystem. The system further includes a quality of service (QoS) switch executing a QoS monitor module that decides to display the first set of parameter data being rendered by the first subsystem or the second set of parameter data being rendered by the second subsystem depending on an availability and load of the first subsystem as determined by a lag and a stability threshold. The system further includes a display connected to the QoS switch.

20 Claims, 10 Drawing Sheets

(51) Int. Cl.
*H04L 12/40* (2006.01)
*H04L 67/1034* (2022.01)
*H04L 67/1008* (2022.01)
*H04L 43/0852* (2022.01)
*H04L 43/0817* (2022.01)
*H04L 43/045* (2022.01)
*H04L 67/12* (2022.01)
*G06F 9/50* (2006.01)
*G06T 15/00* (2011.01)
*H04L 43/16* (2022.01)
*H04L 69/40* (2022.01)

(52) U.S. Cl.
CPC ...... *G06T 15/005* (2013.01); *H04L 12/40202* (2013.01); *H04L 43/045* (2013.01); *H04L 43/0817* (2013.01); *H04L 43/0852* (2013.01); *H04L 43/16* (2013.01); *H04L 67/1008* (2013.01); *H04L 67/12* (2013.01); *H04L 69/40* (2013.01); *H04L 2012/40215* (2013.01)

(58) Field of Classification Search
CPC ..... H04L 43/16; H04L 67/1008; H04L 67/12; H04L 69/40; H04L 2012/40215; G06F 9/50; G06F 11/0793; G06T 15/005
See application file for complete search history.

(56) References Cited

U.S. PATENT DOCUMENTS

| | | | |
|---|---|---|---|
| 7,961,194 B2 | 6/2011 | Bakalash et al. | |
| 8,134,563 B2 | 3/2012 | Bakalash et al. | |
| 9,818,311 B2 | 11/2017 | Zboray et al. | |
| 9,916,674 B2 | 3/2018 | Kilgard | |
| 10,187,841 B1 | 1/2019 | Muthuswamy | |
| 2008/0312851 A1 | 12/2008 | Kagan et al. | |
| 2009/0096798 A1* | 4/2009 | Bakalash | G06T 15/005 345/506 |
| 2015/0110364 A1* | 4/2015 | Niinuma | G06K 9/00255 382/116 |
| 2016/0102348 A1* | 4/2016 | Donnet | G16B 25/00 702/20 |
| 2017/0026656 A1* | 1/2017 | Aerts | H04N 19/119 |
| 2018/0107519 A1* | 4/2018 | Wang | G06F 9/5011 |
| 2018/0108109 A1* | 4/2018 | Zhan | G06F 9/505 |
| 2019/0066368 A1 | 2/2019 | Paul et al. | |
| 2019/0073323 A1 | 3/2019 | Halavarthi Math Revana et al. | |
| 2021/0013920 A1* | 1/2021 | Na | H04B 1/44 |
| 2021/0073047 A1* | 3/2021 | Bhandaru | H04L 41/0893 |
| 2021/0312179 A1* | 10/2021 | Lee | G06T 7/11 |
| 2021/0344736 A1* | 11/2021 | Ringenberg | H04L 43/087 |

* cited by examiner

CLUSTER SYSTEM WITH FAIL-SAFE FALLBACK MECHANISM

RELATED APPLICATIONS

This application is a continuation of U.S. patent application Ser. No. 16/107,438, filed Aug. 21, 2018, which claims priority to Indian Application No. 201741030266, filed Aug. 28, 2017, each of which is incorporated herein in its entirety.

TECHNICAL FIELD

This disclosure relates to techniques for rendering images, and more particularly to techniques for implementing fail-safe cluster systems.

BACKGROUND

Cluster systems are used to implement data rendering applications. For example, a digital instrument cluster system renders a set of instrumentation data displayed with a digital interface rather than traditional analog gauges. Digital instrument clusters are typically rendered on a graphics processing unit (GPU) which is managed by a high-level operating system (HLOS). Digital instrument clusters are reconfigurable, and can be customized based on user preferences.

SUMMARY

This disclosure relates to a system and method to implement a fail-safe cluster system for a cluster application.

In one example, a fail-safe cluster system is disclosed. The system includes a first subsystem comprising a graphic processing unit (GPU) that executes a high-level operating system (HLOS) on a primary processor and renders a first set of parameter data, a second subsystem that executes a real-time operating system (RTOS) on an auxiliary core processor and renders a second set of parameter data, a controller area network (CAN) connected to a parameter data source input and to the first subsystem and the second subsystem, a quality of service (QoS) switch executing a QoS monitor module, the QoS switch connected to the first subsystem through a communication line, and to the second subsystem through another communication line, wherein the QoS monitor module decides to display the first set of parameter data being rendered by the first subsystem or the second set of parameter data being rendered by the second subsystem depending on an availability and load of the first subsystem as determined by a lag threshold and a stability threshold, and a display connected to the QoS switch configured to display either first set of parameter data being rendered by the first subsystem or the second set of parameter data being rendered by the second subsystem.

In another example, a method to implement a fail-safe cluster system is disclosed. The method includes displaying a first set of parameter data being rendered by a first subsystem in response to a stability count exceeding a stability threshold, displaying a second set of parameter data being rendered by a second subsystem in response to a lag count exceeding a lag threshold, continuing to display the first set of parameter data being rendered by the first subsystem in response to the lag count not exceeding the lag threshold, and continuing to display the second set of parameter data being rendered by the second subsystem in response to the stability count not exceeding the stability threshold.

In yet another example, a system on a chip (SoC) that implements a fail-safe cluster system is disclosed. The SoC includes a first subsystem comprising a graphic processing unit (GPU) that executes a high-level operating system (HLOS) on a primary processor and renders a first set of parameter data, a second subsystem that executes a real-time operating system (RTOS) on an auxiliary core processor and renders a second set of parameter data, a controller area network (CAN) connected to a parameter data source input and to the first subsystem and the second subsystem, a quality of service (QoS) switch executing a QoS monitor module, the QoS switch connected to the first subsystem through a communication line, and to the second subsystem through another communication line, wherein the QoS monitor module decides to display the first set of parameter data being rendered by the first subsystem or the second set of parameter data being rendered by the second subsystem depending on an availability and load of the first subsystem as determined by a lag threshold and a stability threshold, and a display connected to the QoS switch configured to display either the first set of parameter data being rendered by the first subsystem or the second set of parameter data being rendered by the second subsystem.

DETAILED DESCRIPTION

A cluster is a system or subsystem comprising a number of different hardware and software components that implement an application and cooperate to gather data and then render that data onto a display. For example, a digital instrument cluster can be used to render data to a digital instrument panel for a vehicle, where the digital instrument panel includes information important to the driver such as speed, fuel level, and navigation information. Clusters that have a GPU are more powerful than clusters that do not have a GPU. This is because the GPU itself is capable of performing interesting and sophisticated graphical functions (e.g., three-dimensional (3D) rendering and 3D blending). Sometimes the cluster can crash. Thus, what is needed is a backup system that can be used to display data being rendered by the backup system in the event of the primary cluster system crashing.

Disclosed herein is an example system and method for executing a cluster subsystem having a GPU (a "GPU cluster subsystem") and fallback cluster subsystem not having a GPU (a "GPU-less fallback cluster subsystem") concurrently such that the GPU-less fallback cluster subsystem acts as a fail-safe mechanism. In particular, the GPU-less fallback cluster subsystem is used to display parameter data when the GPU is unavailable or has crashed. In some examples, the GPU cluster subsystem and the GPU-less fallback cluster subsystem are implemented on the same system on a chip (SoC). Also disclosed is an example method to synchronize parameters between the GPU cluster subsystem and GPU-less fallback cluster subsystem such that if there is a switch between which of the parameter data being rendered by the subsystems is being displayed, the switch is glitch-free and unnoticed by a user of the cluster application. Also disclosed is an example implementation of the multiplexing of data sources from a GPU cluster subsystem and a GPU-less fallback cluster subsystem to facilitate use of display pipeline hardware.

Cluster systems typically implement a high-level operating system (HLOS). HLOS such as a Linux operating system or an Android operating system, for example, with monolithic kernels can crash due to software vulnerabilities such as rogue memory access, faulty-drivers, etc. In the event of an HLOS crash, the cluster application freezes and subsequent updates to the display cease. This can be hazardous as the driver has no feedback on the state of the car and the system may need to be restarted to bring the cluster display back to the acceptable state. Moreover, if the HLOS crashes, there is no mechanism to detect the crash and switch to a fallback mechanism. On some devices, the cluster can be rendered from a GPU with the application control residing on a microprocessor unit (MPU), leading to a single point of failure. In the event of an HLOS crash, a system may need to be rebooted for subsequent cluster information.

The present disclosure, herein described by the disclosed examples, may solve one or more of the aforementioned problems. For example, the present disclosure involves a system executing a fallback cluster subsystem without a GPU (a "GPU-less fallback cluster subsystem") while at the same time as executing a cluster subsystem with a GPU (a "GPU cluster subsystem"), such that when the GPU cluster fails, the system can switch to the GPU-less fallback cluster subsystem in a safe manner, glitch-free and with small latency. "Switching" from one cluster subsystem to another cluster subsystem involves switching from displaying data being rendered by one cluster subsystem (e.g., the GPU cluster subsystem) to displaying data being rendered by another cluster subsystem (e.g., the GPU-less fallback cluster subsystem).

The QoS monitor module monitors the load, availability, and performance of the GPU cluster subsystem, and executes a function to switch between the GPU cluster subsystem and the GPU-less fallback cluster subsystem in a time no greater than the time to render two frames. In some examples, the latency can be about 32 milliseconds (or other time), in practice. Switching between the GPU cluster subsystem and the GPU-less fallback cluster subsystem within a predetermined amount of time to achieve a latency value facilitates safety of a cluster application implemented by the system. The QoS monitor module decides to display the parameter data being rendered by the GPU cluster subsystem or the parameter data being rendered by the GPU-less fallback cluster subsystem depending on an availability and load of the GPU cluster subsystem as determined by an adaptive lag threshold and a stability threshold.

The system and method disclosed herein provides the following advantages: 1) the display is not frozen on an HLOS crash, and the user continues to receive updates on various data parameters (e.g., for a digital instrument panel cluster application, data such as speed, RPM, etc.); 2) the user does not notice a glitch when a switch between the cluster subsystems occurs; 3) there is no discontinuity while switching between cluster subsystems; and 4) cluster information is also updated in the event of overload of the GPU cluster subsystem or HLOS crash.

The disclosed examples provide a system, method, and SoC that implement the concurrent execution of a GPU cluster subsystem and a GPU-less fallback cluster subsystem. While the GPU cluster subsystem is executing to render parameter data, the GPU-less fallback cluster subsystem is also executing to render parameter data, the GPU-less fallback cluster subsystem utilizing an auxiliary core processor. Data rendered by the GPU cluster subsystem is displayed when the HLOS is operational and the GPU is available. Accordingly, the GPU-less fallback cluster subsystem is a redundant system. Data from a controller area network (CAN) is fed to the GPU cluster subsystem and the GPU-less fallback cluster subsystem while facilitating synchronization. A robust quality of service (QoS) monitor tracks the availability of the GPU cluster subsystem and triggers a switch between subsystems based on available resources. This facilitates that data is being displayed even upon an HLOS crash. The solution can be implemented on a system on a chip (SoC), for example. The provided examples provide a fail-safe architecture, the synchronization of data between the GPU cluster subsystem and GPU-less fallback cluster subsystem, and the multiplexing of data sources to better use display pipeline hardware.

As will be explained in more detail below, a heterogeneous architecture can be leveraged to execute a GPU cluster subsystem and a GPU-less fallback cluster subsystem concurrently such that the GPU-less fallback cluster is executing on auxiliary cores. The auxiliary cores run a real-time operating system (RTOS), which provides for robust and deterministic execution. The system isolates components from the HLOS while utilizing the GPU as client to render parameter data. Certain components (display, CAN, GPU-less fallback cluster subsystem and QoS monitor) are isolated from the HLOS and execute on the RTOS. The architecture facilitates executing two cluster subsystems concurrently and switching between them based on resource availability.

As will be explained in more detail below, an example method involves the synchronization of parameters between the clusters. The GPU-less fallback cluster subsystem updates a local copy of instrument display data received from the CAN. Concurrently, the CAN data is forwarded to the GPU cluster subsystem through a synchronous inter-process communication mechanism. The GPU cluster subsystem updates its memory with instrument display data received from the CAN, which is then used to render the cluster content. The GPU cluster subsystem also sends an acknowledgement to the GPU-less fallback cluster subsystem. A robust QoS monitor facilitates cluster availability. The QoS monitor executes on the auxiliary core processor and monitors the performance of the GPU cluster subsystem. When the GPU cluster subsystem is available, the QoS monitor facilitates a switch to the cluster rendered by the HLOS, namely the GPU cluster subsystem. When the HLOS has crashed or resources needed to render the GPU cluster subsystem are unavailable, the QoS monitor facilitates a switch to the GPU-less fallback cluster subsystem with minimal latency. While the amount of time is configurable, in one example the time between detection that the HLOS is down and completing the switch is 32 milliseconds. Rendering data to the display at 60 frames per second (fps) is an industry standard, and 60 frames per second is approximately one frame per 16 milliseconds. If there is a drop of two frames (for approximately 32 milliseconds), then in one example a switch is appropriate.

As will also be explained in more detail below, multiplexing of data from the GPU cluster subsystem and the GPU-less fallback cluster subsystem promotes efficient use of display pipeline hardware, reducing the hardware by approximately half.

Figure 1:
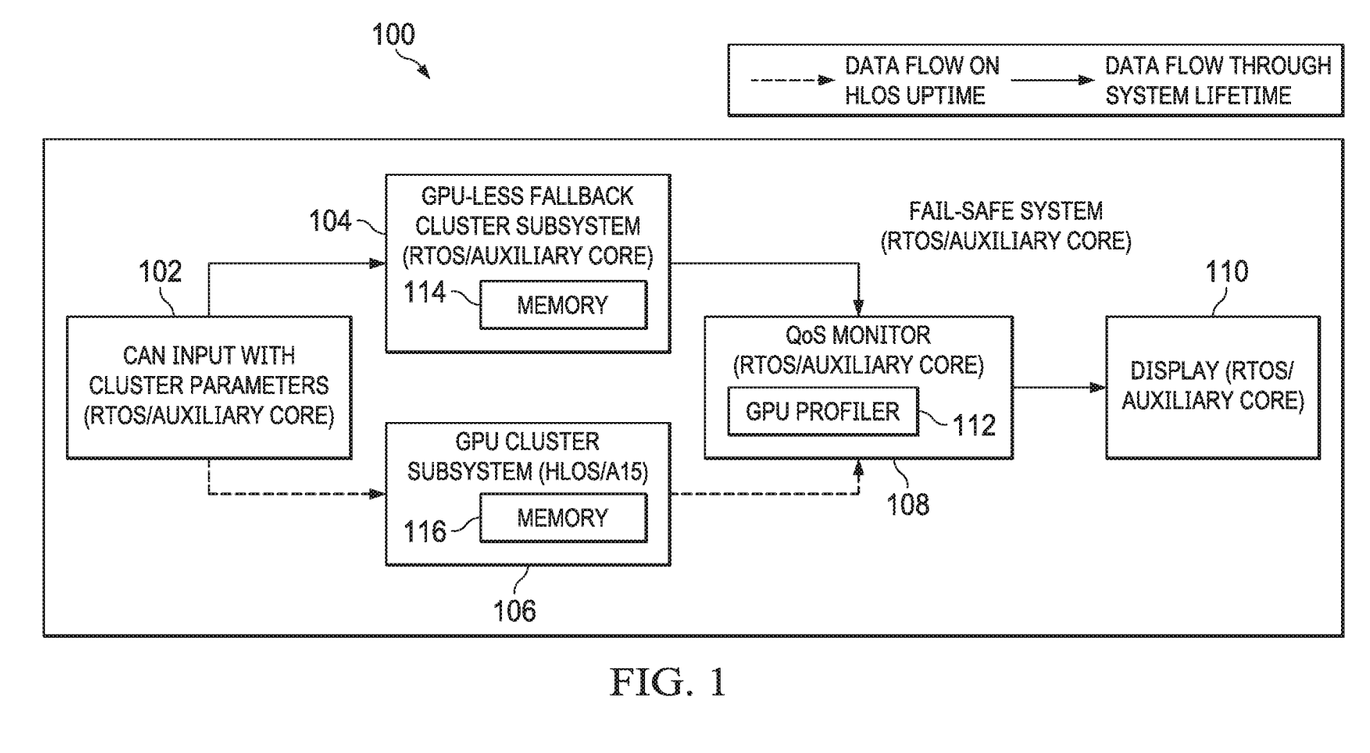
FIG. 1 is a block diagram of an example fail-safe system.

FIG. 1 is a block diagram of an example architecture of a fail-safe system 100. Parameters for a cluster application are fed to a processor using a controller area network (CAN) 102. The CAN 102 includes a plurality of sensors that are present within the application (e.g., an automotive system) and which feed the data parameters to a main processor. For a car dashboard cluster application, the parameters would be speed, motor RPM, engine temperature, etc. These parameters are updated and stored in the memory 114 of the GPU-less fallback cluster subsystem 104 as well as the memory 116 of the GPU cluster subsystem 106. The QoS monitor 108 is responsible for monitoring the availability and load of the GPU cluster subsystem and facilitating switching between the GPU cluster subsystem 106 and the GPU-less fallback cluster subsystem 104. The QoS monitor 108 implements a GPU subsystem profiler 112 component to monitor the availability and load of the GPU cluster subsystem 106. A display 110 digitally displays the parameter data being rendered by the GPU cluster subsystem 106 or the GPU-less fallback cluster subsystem. In the case of a digital instrument cluster application for rendering data to a car dashboard display, the display includes a number of gauges that may include a speed dial, an RPM dial, and an engine temperature dial.

As shown in FIG. 1, the GPU cluster subsystem 106 executes a high-level operating system on a high performance processor (e.g., an A15 processor), while the CAN 102, GPU-less fallback cluster subsystem 104, QoS monitor 108, and display 110 execute on a real-time operating system (RTOS) that executes on an auxiliary core processor. Many different vendors provide an RTOS, and most RTOS are safety certified, which prevents the RTOS from crashing. The RTOS also has a limited set of tasks that it does while an HLOS like Linux has much greater functionality. Execution on the RTOS by the components of the system isolated from the HLOS facilitates that at least one cluster subsystem is operating at a given time. FIG. 1 also shows the data flow on HLOS uptime (shown by the dashed arrows) versus the data flow through system lifetime (shown by the solid arrows). When the GPU cluster subsystem 106 is up and running, data flows from the CAN 102, to the GPU cluster subsystem 106, to the QoS monitor 108 and then to the display 110. When the GPU-less fallback cluster subsystem 104 is used to display data (when the GPU cluster subsystem 106 is down or when the load on the GPU cluster subsystem 106 is too great), data flows from the CAN 102, to the GPU-less fallback cluster subsystem 104, to the QoS monitor 108 and then to the display 110. The GPU cluster subsystem and the GPU-less fallback cluster subsystem execute concurrently but render data independently. In some examples, the fail-safe system 100 is implemented on a system on a chip (SoC).

Figure 2:
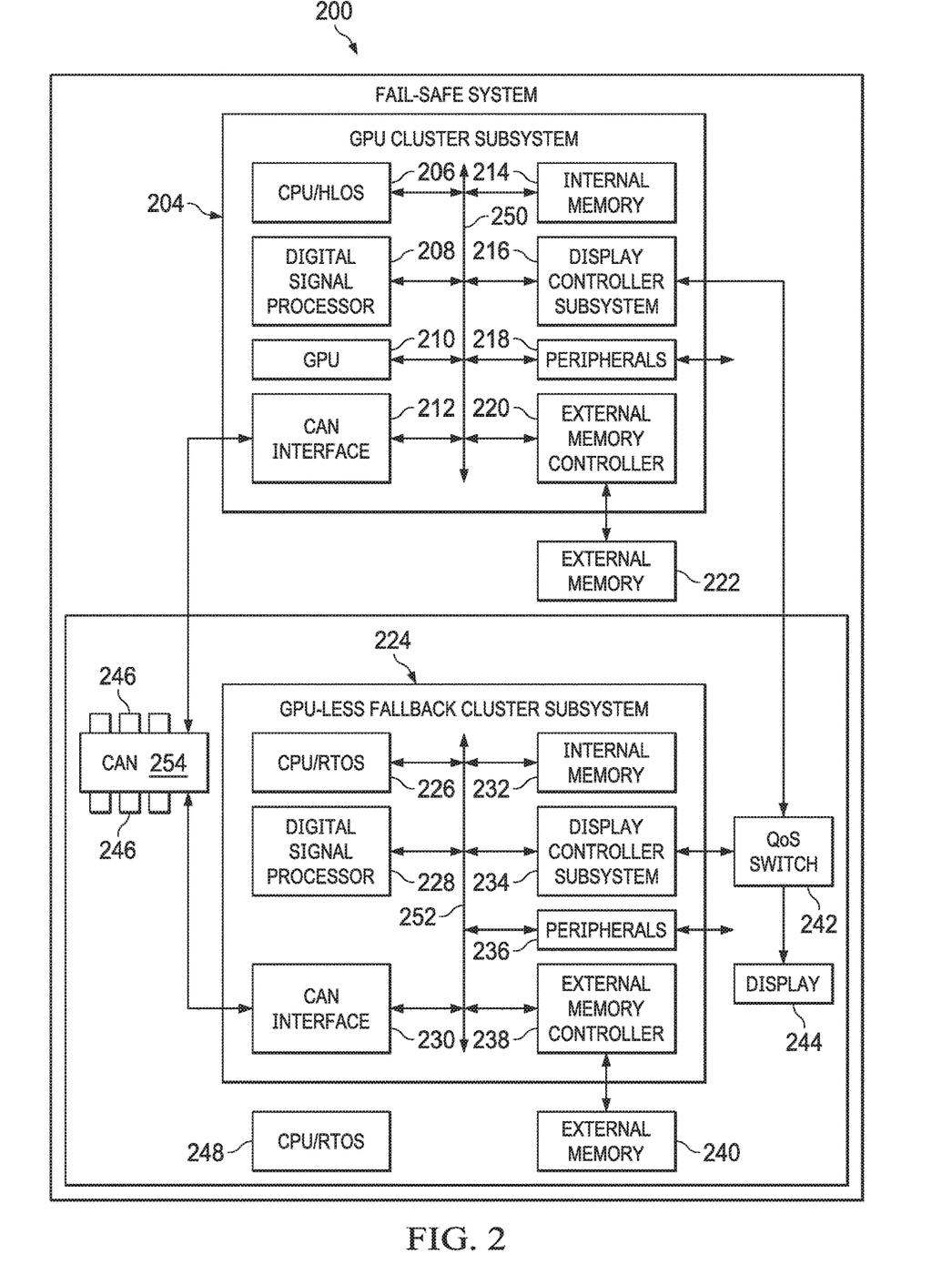
FIG. 2 is another block diagram of an example fail-safe system.

FIG. 2 is a block diagram showing another example fail-safe system 200 including the components and data flow of a GPU cluster subsystem 204 and a GPU-less fallback cluster subsystem 224. The GPU cluster subsystem 204 includes a central processing unit (CPU) 206 that executes a high-level operating system (HLOS), digital signal processor (DSP) 208, graphics processing unit (GPU) 210, CAN interface 212, internal memory 214, display controller subsystem 216, peripherals 218 and external memory controller 220. In this example, these parts can be bidirectionally connected to a system bus 250. The general purpose CPU 206 typically executes what is called control code. DSP 208 typically operates to process images and real-time data. These processes are typically regarded as filtering. Processes such as geometric correction are performed by DSP 208. GPU 210 performs image synthesis and display oriented operations used for manipulation of the data to be displayed. CAN interface 212 interfaces with the CAN 254. Attached to the CAN 254 are various sensors 246 that obtain external information (in the case of a car application, information about engine temperature, speed, etc.). Internal memory 214 stores data used by other units and may be used to pass data between units. The existence of internal memory 214 on the GPU cluster subsystem 204 does not preclude the possibility that general purpose CPU 206, DSP 208 and GPU 210 may include instruction and data caches. Display controller subsystem 216 sends data buffers to the QoS switch 242 which is controlled by monitoring software. The QoS switch 242 decides whether to post data buffers onto the display 244 from the GPU cluster subsystem 204 or the GPU-less fallback cluster subsystem 224. Peripherals 218 may include various parts such as a direct memory access controller, power control logic, programmable timers and external communication ports for exchange of data with external systems (as illustrated schematically in FIG. 2). External memory controller 220 controls data movement into and out of external memory 222.

The GPU-less fallback cluster subsystem 224 is configured similarly, except that it does not have a GPU and its CPU 226 executes on the RTOS. Like the GPU cluster subsystem 204, the GPU-less fallback cluster subsystem 224 includes a DSP 228, CAN interface 230, internal memory 232, display controller subsystem 234, peripherals 236, external memory controller 238 to interface with external memory 240, and system bus 252.

Figure 3:
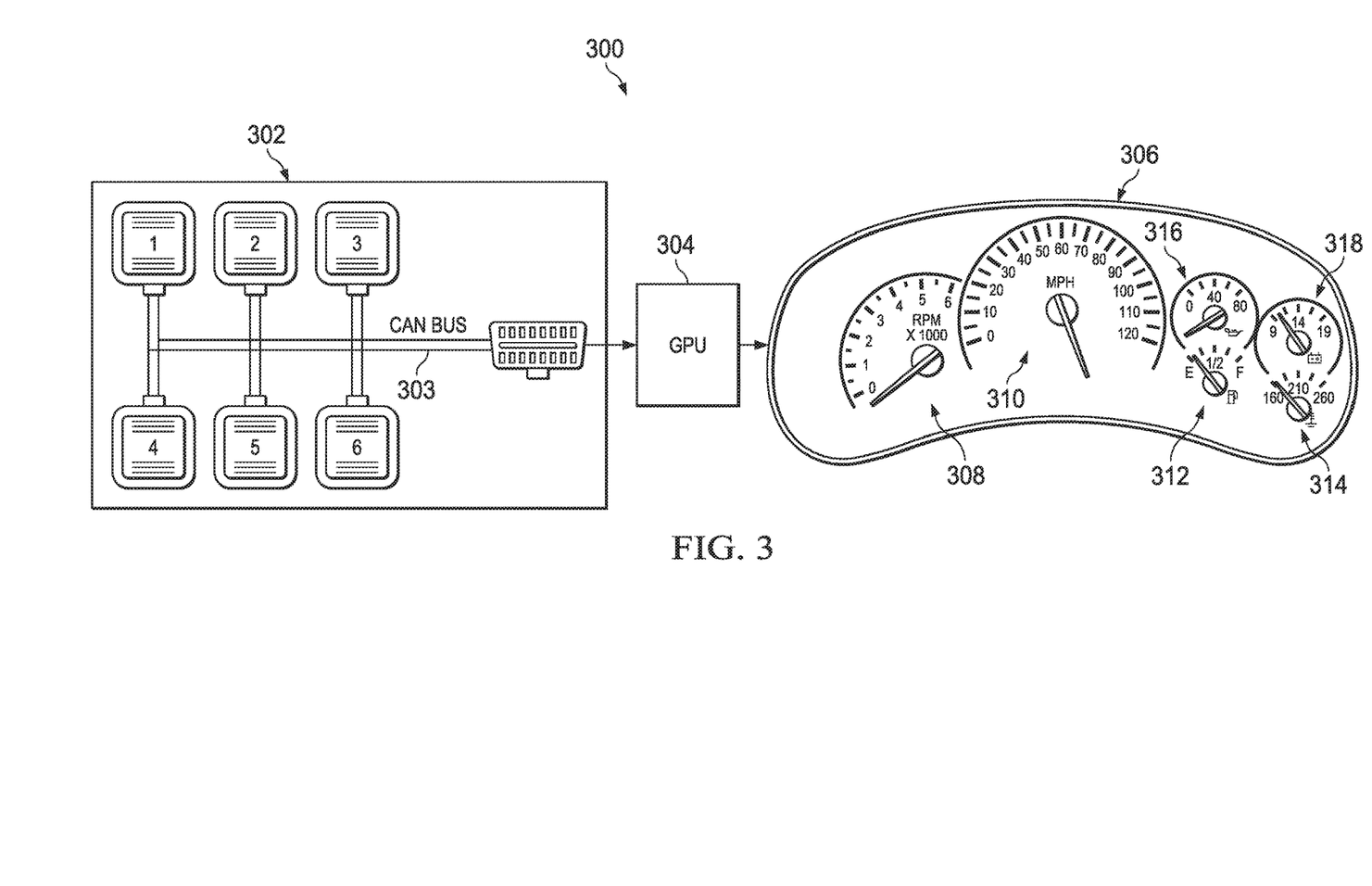
FIG. 3 is a schematic illustration of parameter data being rendered by a GPU to a digital instrument panel.
Figure 4:
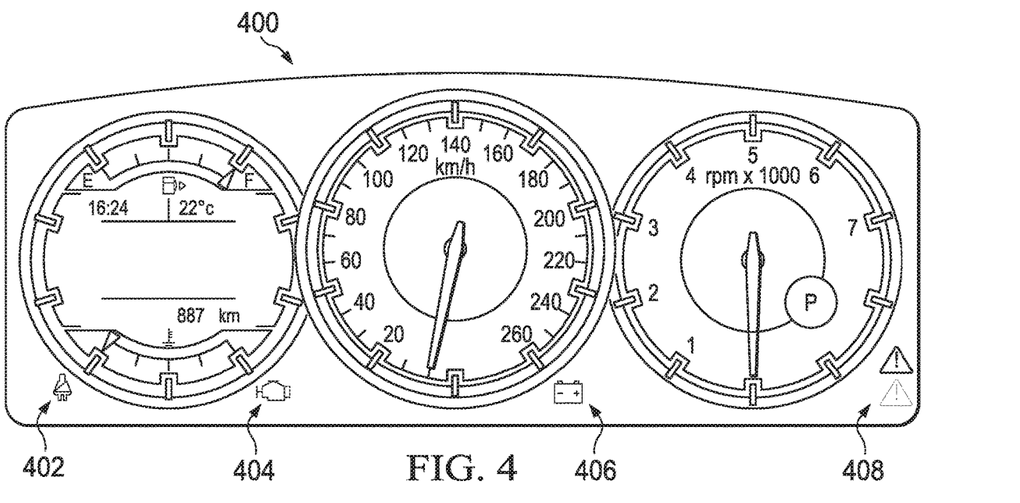
FIG. 4 is an example digital instrument cluster application, namely a car dashboard.

FIG. 3 is a schematic illustration 300 of parameter data being rendered by a GPU 304 to a digital instrument panel 306, utilizing a digital instrument cluster system. Vehicle parameters 1 through 6 are propagated through the CAN Network 302, and are fed to the GPU 304 via the CAN bus 303. The GPU 304 renders cluster dials, needles and telltale signs based on the CAN input. In this example, the digital instrument panel 306 shows the engine RPM 308, speed in miles per hour (MPH) 310, fuel level 312, coolant temperature 314, oil pressure 316, and battery charge voltage level 318. An advantage of digital instrument cluster systems is that they are easily reconfigurable, and can be customized as per user preferences. FIG. 4 shows another example of a GPU rendered digital dashboard 400. In this display additional warning lights are displayed, such as a seatbelt indicator 402, engine warning light 404, battery warning light 406, and other warning indicators 408.

Figure 5:
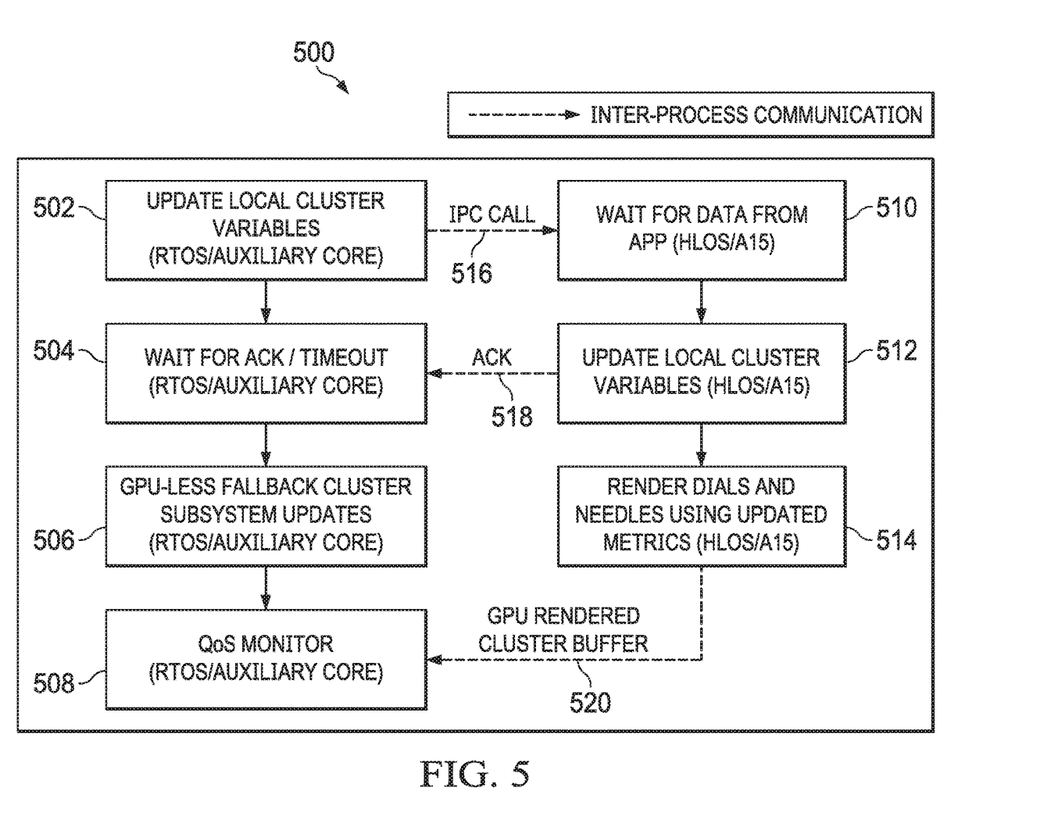
FIG. 5 is a block diagram illustrating the synchronization of GPU cluster subsystem parameter data and GPU-less fallback cluster subsystem parameter data.

FIG. 5 is a block diagram 500 illustrating the synchronization of GPU cluster subsystem and GPU-less fallback cluster subsystem parameters. Reference numbers 502, 504, and 506 refer to operations of the GPU-less fallback cluster subsystem executing the RTOS on an auxiliary core processor, while reference numbers 510, 512, and 514 refer to operations of the GPU cluster subsystem executing an HLOS on a high performance processor such as an A15. When the two cluster subsystems (the GPU cluster subsystem and the GPU-less fallback cluster subsystem) are executing, the synchronization shown in the block diagram 500 provides for the GPU cluster subsystem and the GPU-less fallback cluster subsystem to display a similar data output. If the data was not synchronized, there would be a chance (because of a delay of the CAN to service either the GPU cluster subsystem or the GPU-less fallback cluster subsystem) that the user would see a different speed or fuel level upon switching between clusters.

To achieve the synchronization, data flows through the clusters concurrently. Unless the GPU cluster subsystem and the GPU-less fallback cluster subsystem have received an update of data, neither of the subsystems takes action. However, there is a form of timeout, because if the clusters are attempting to receive a data update and the GPU cluster subsystem crashes, then the fallback cluster subsystem should not be waiting for the GPU cluster subsystem to also receive the data update.

If the CAN input data is provided to the GPU-less fallback cluster subsystem first, then at 502, the GPU-less fallback cluster subsystem updates its local variables (such as speed, rpm, and so forth). The GPU-less fallback cluster subsystem can then send an interprocess communication 516 to the GPU cluster subsystem (the interprocess communication 516 can actually be between the auxiliary core and an A15 or other high performance processor). The GPU cluster subsystem waits at 510 for this message for receiving GPU-less fallback cluster subsystem local cluster variables by the GPU cluster subsystem. After the GPU cluster subsystem receives the interprocess communication 516 (and receives the GPU-less fallback cluster subsystem local cluster variables), then at 512, the GPU cluster subsystem updates its own variables by updating local cluster variables on the GPU cluster subsystem received from the controller area network based on the received GPU-less fallback cluster subsystem local cluster variables. The GPU cluster subsystem can use this update to render data (a needle, an and so forth) on a digital display. After the GPU cluster subsystem updates its cluster variables at 512, the GPU cluster subsystem sends an acknowledgement 518 to the GPU-less fallback cluster subsystem. At 504, the GPU-less fallback cluster subsystem waits for this acknowledgement 518. If the GPU-less fallback cluster subsystem does not receive the acknowledgement 518 within a predetermined time, the GPU-less fallback cluster subsystem determines that there is an error with the system or the GPU cluster subsystem, and does not wait for the acknowledgement 518 (e.g., there is a timeout at 504), and then proceeds to update its own cluster 506.

The acknowledgement 518 facilitates the concurrent updating of data between the GPU cluster subsystem and the GPU-less fallback cluster subsystem, which is the purpose of the acknowledgement. If the GPU-less fallback cluster subsystem does receive the acknowledgement 518, the GPU-less fallback cluster subsystem can update its own cluster 506. Meanwhile, the GPU cluster subsystem can proceed and render the display data (draw dials and needles) using its updated metrics 514. After the GPU cluster subsystem has rendered the display data, the GPU cluster subsystem can send its 3D content comprising a 3D canvas that provides the data (a GPU rendered cluster buffer 520) to the Quality of Service (QoS) monitor. The GPU cluster subsystem proceeds by sending GPU rendered cluster buffers to the quality of service (QoS) monitor. The GPU then proceeds by rendering static and dynamic asset data based on the GPU cluster subsystem local cluster variable update. At 506, the GPU-less fallback cluster subsystem also sends its cluster updates and data to the QoS monitor. At 508, the QoS monitor decides whether to display data from the GPU cluster subsystem or the GPU-less fallback cluster subsystem.

The rendering of the data by the GPU cluster subsystem is generally richer than the rendering of data by the GPU-less fallback cluster subsystem. A GPU cluster subsystem is more powerful than the GPU-less fallback cluster subsystem, as it provides functionality for a myriad of interesting effects (for example, if the dials are to be rotated or if a graphically rich feature is to be implemented such as the needle changing color or providing a shadow effect when at a certain speed (e.g., 80 mph)). As such, the GPU-less fallback cluster subsystem, in some examples, may provide the minimum information needed to render data and provide safety to a user/driver (or a smaller amount of information than that which is provided by the GPU cluster subsystem).

Figure 6:
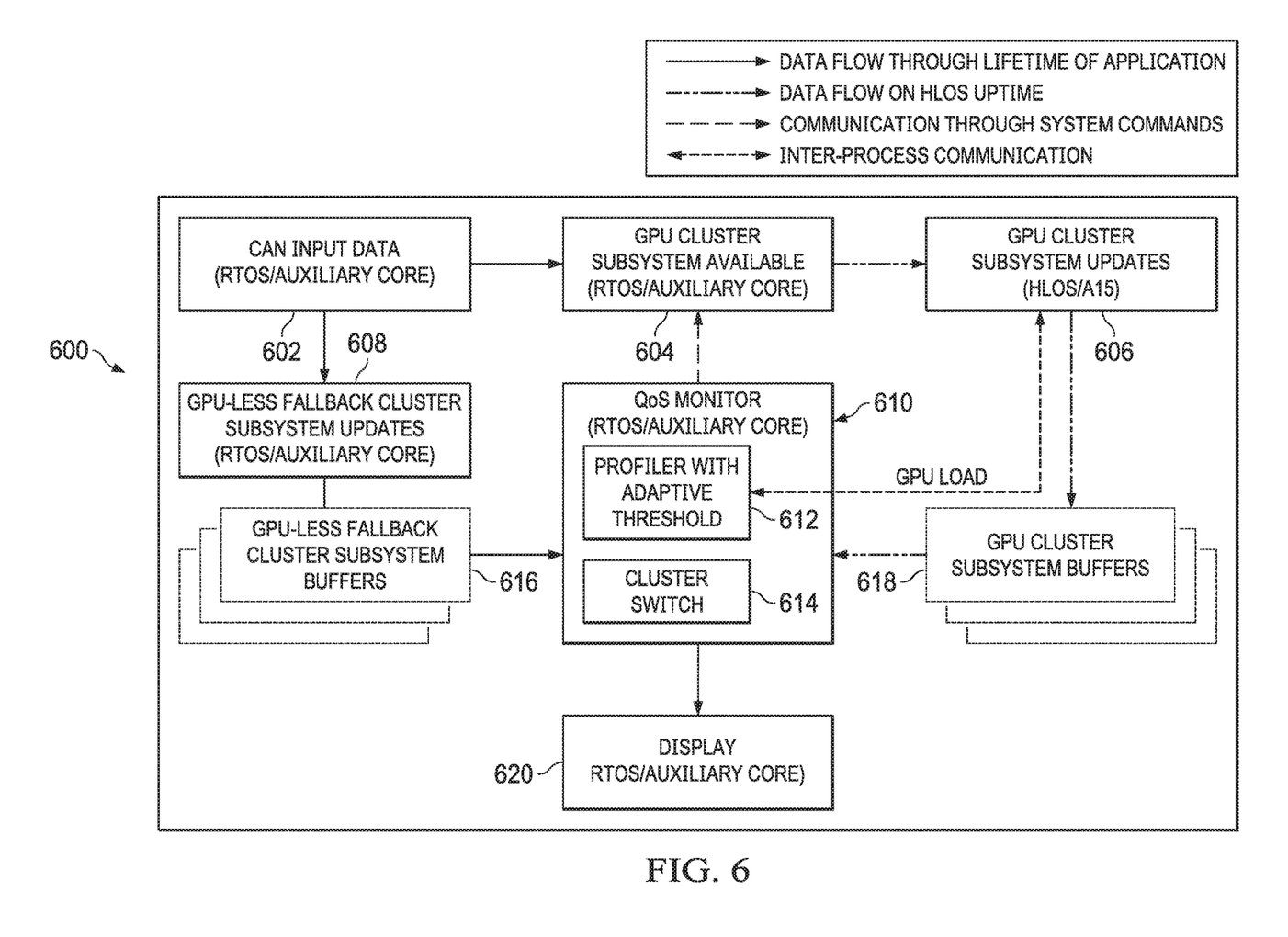
FIG. 6 is an architecture diagram illustrating how a quality of service (QoS) monitor interacts with the GPU cluster subsystem and GPU-less fallback cluster subsystem.

FIG. 6 is an example of an architecture diagram 600 illustrating how the QoS monitor interacts with the GPU cluster subsystem and GPU-less fallback cluster subsystem. The GPU cluster subsystem updates 606 and the GPU-less fallback cluster subsystem updates 608 can be based on input data received from the CAN 602. The QoS monitor 610, via the profiler 612, checks if the GPU cluster subsystem is up and executing and if the GPU cluster subsystem is available 604. The QoS monitor 610 is also responsible for detecting the load on the GPU cluster subsystem (the QoS monitor module probes the GPU cluster subsystem to receive its load) and for dynamically modifying an adaptive lag threshold based on the load of the GPU cluster subsystem. The QoS monitor 610 also includes a switch module 614 for switching between the GPU-less fallback cluster subsystem and GPU cluster subsystem for display 620 based on availability of the GPU cluster subsystem. The adaptive lag-threshold is configurable and dynamically updated based on the load of the GPU cluster subsystem, the load of the GPU cluster subsystem being obtained by the profiler 612.

Figure 7:
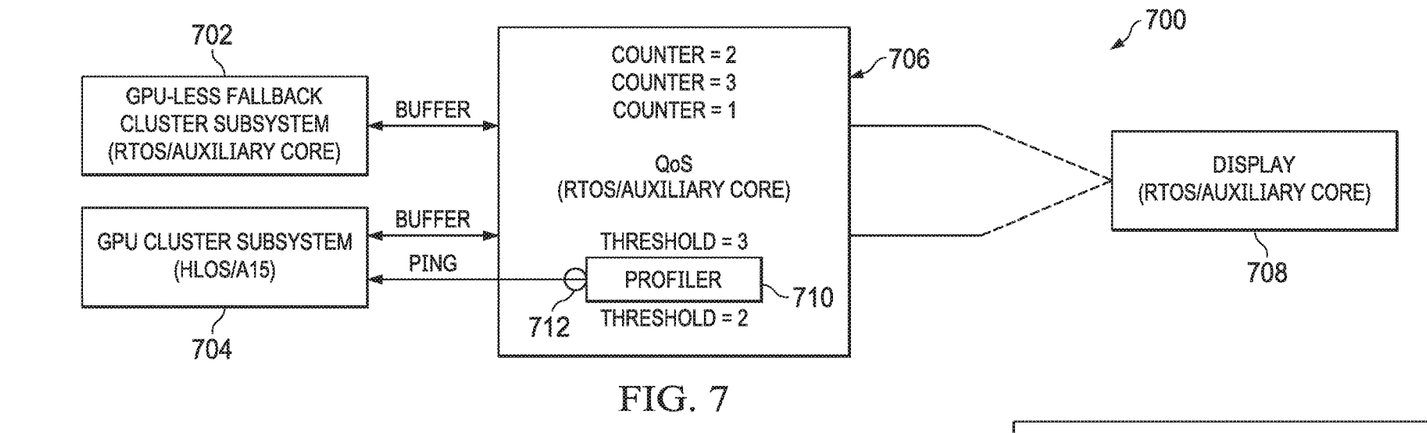
FIG. 7 is a diagram illustrating the mechanism of a GPU subsystem profiler component of a QoS monitor.

If there is a sharp spike or dip in the GPU load, the QoS monitor 610 modifies the adaptive lag threshold accordingly. A lag count keeps track of cluster buffers from auxiliary cores of the GPU-less fallback cluster subsystem 616 since the last buffer from received from the GPU cluster subsystem. If the lag count is greater than the adaptive lag threshold the QoS monitor 610 switches to the GPU-less fallback cluster subsystem. The QoS monitor also maintains a stability count and a stability threshold. The stability count tracks how often buffers are received from the GPU cluster subsystem. The stability threshold determines when it is safe, or prudent, to switch from the GPU-less fallback cluster subsystem to the GPU cluster subsystem such that the QoS monitor decides to display data rendered by the GPU cluster subsystem when the stability count exceeds the stability threshold. The stability threshold is configurable (e.g., by a design engineer of the fail-safe system), and in some examples is determined experimentally. Accordingly, the QoS monitor 610 maintains the lag count, adaptive lag threshold, stability count, and stability threshold. Based on the subsystem to be used to display parameter data, the QoS monitor 610 chooses the channel to be used and posts corresponding buffers onto the display 620. FIG. 6 additionally indicates whether the data flow is through the lifetime of the application (i.e., when the cluster application is on and executing) or on HLOS uptime, and whether a communication is through system commands or an interprocess communication FIG. 7 is an example diagram 700 illustrating the mechanism of the GPU cluster subsystem profiler 710 (similar to profiler 612 in FIG. 6) of the QoS monitor 706 which tracks buffer updates from the GPU cluster subsystem 704 and the GPU-less fallback cluster subsystem 702. FIG. 7 represents a steady state, or when the GPU-less fallback cluster subsystem 702 and the GPU cluster subsystem 704 are executing. Initially, a threshold (e.g., the adaptive lag threshold or the stability threshold) is set to 2. The GPU cluster subsystem profiler 710 sends a ping 712 using an interprocess communication to the GPU cluster subsystem 704 to determine a state and load of the GPU cluster subsystem 704 including how much memory the GPU cluster subsystem 704 is consuming. Alternatively, the GPU cluster subsystem profiler 710 could read registers updated by the GPU cluster subsystem (i.e., read an area of memory accessible to many processors) to determine the GPU cluster's activity and load. The GPU cluster subsystem profiler 710 receives this information from the GPU cluster subsystem 704. This is a steady state, so the GPU-less fallback cluster subsystem 702 can send a buffer to the QoS monitor 706, but because the GPU cluster subsystem 704 is still executing and has not crashed, the QoS monitor 706 does not render the data from the GPU-less fallback cluster subsystem 702 on the display 708 but instead sends the buffer back to the GPU-less fallback cluster subsystem 702; and, the QoS monitor 706 can render data provided in the buffer sent by the GPU cluster subsystem 704 on the display 708. When the GPU-less fallback cluster subsystem 702 sends a buffer through the QoS monitor 706, a counter (e.g., the lag count) can be incremented. After the buffer from the GPU cluster subsystem 704 proceeds through the QoS monitor 706, a counter (e.g., a stability count) can be set to zero (alternatively, in other example, the stability count can be decremented rather than be set to zero). The QoS monitor 706 checks whether the counter (e.g., the lag count or the stability count) exceeds a threshold value (e.g., an adaptive lag threshold or the stability threshold), and if so, the QoS monitor 706 determines whether to switch from the GPU cluster subsystem 704 to the GPU-less fallback cluster subsystem 702 or vice versa. In an example implementation, when the GPU-less fallback cluster subsystem's rendered data is being displayed, the QoS monitor 706 switches from the GPU-less fallback cluster subsystem 702 to the GPU cluster subsystem 704 in response to the stability count exceeding the stability threshold. In another example implementation, when the GPU cluster subsystem's rendered data is being displayed, the QoS monitor 706 switches from the GPU cluster subsystem 704 to the GPU-less fallback cluster subsystem 702 in response to the lag count exceeding the adaptive lag threshold. In some examples, the QoS monitor 706 sets the lag count to zero (or decrements the lag count) upon receiving a buffer from the GPU cluster subsystem 704, and the QoS monitor 706 sets the stability count to zero (or decrements the stability count) upon either receiving a stale buffer from the GPU cluster subsystem 704 or upon switching from the GPU cluster subsystem 704 to the GPU-less fallback cluster subsystem 702.

Suppose, in one example, that the GPU cluster subsystem 704 is being used for navigation simultaneously with being used to render vehicle data (the GPU cluster subsystem 704 can be used for a lot of things). This can increase the load on the GPU. Upon the QoS monitor 706 determining that there has been a sharp spike in the load of the GPU cluster subsystem 704, the QoS monitor 706 can dynamically update the adaptive lag threshold value to 3, from an initial adaptive lag threshold value of 2. For example, if a navigation app suddenly consumes the GPU cluster subsystem 704, then the adaptive lag threshold value is set to 3 from 2. Then, as GPU-less fallback cluster subsystem 702 sends its buffer, the lag count is constantly being incremented concurrently, because the GPU cluster is busy performing something else (namely servicing the navigation app) the GPU is not sending its buffer to reset the lag count to zero or decrement the lag count. Because of this, the QoS monitor 706 can decide to switch to the GPU-less fallback cluster subsystem 702 (display the data being rendered by the GPU-less fallback cluster subsystem 702 rather than the data being rendered by the GPU cluster subsystem 704).

The threshold values (e.g., the adaptive lag threshold and the stability threshold) that the QoS monitor 706 uses to determine to implement switch is configurable. For example, the thresholds may be based on the amount of time that has lapsed between successive GPU cluster subsystem buffer updates. For instance, the threshold values could be set to 6 or 8, and is a variable that is entirely up to the programmer. The adaptive lag threshold, in some examples, may be static and not dynamic. Similarly, the stability threshold is in some examples static, while in some examples dynamic. The thresholds may be set by factoring into how busy the GPU cluster subsystem 704 is before deciding to cause the switch to the GPU-less fallback cluster subsystem 702. For example, assume that a static lag threshold is used, and that a navigation application is to be executed. Navigation applications usually consume a lot of GPU power and resources when they just start up, for a short period of time. A static lag threshold may cause the QoS monitor 706 to switch to the GPU-less fallback cluster subsystem, while a dynamic adaptive lag threshold may determine that boot up is for a short time and thus, not force the switch event. This may be beneficial for a user (e.g., an automobile driver), because switching between clusters too often is distracting and alarming to the user. This is the purpose of a dynamic threshold which takes into consideration the load and activity of the GPU cluster subsystem 704. Additionally, the QoS monitor 706 switches between clusters based on availability of the GPU cluster subsystem. Therefore if the GPU cluster subsystem 704 is constantly sending buffers without lag, the QoS can determine that the GPU cluster subsystem 704 is available, steady, and robust and switch from the GPU-less fallback cluster subsystem 702 to the GPU cluster subsystem 704. In addition to facilitating QoS updates, the QoS monitor 706 can also decide that the GPU is in a desired robust state and can thus cause a switch back to the GPU cluster subsystem 704 from the GPU-less fallback cluster subsystem 702.

Figure 8:
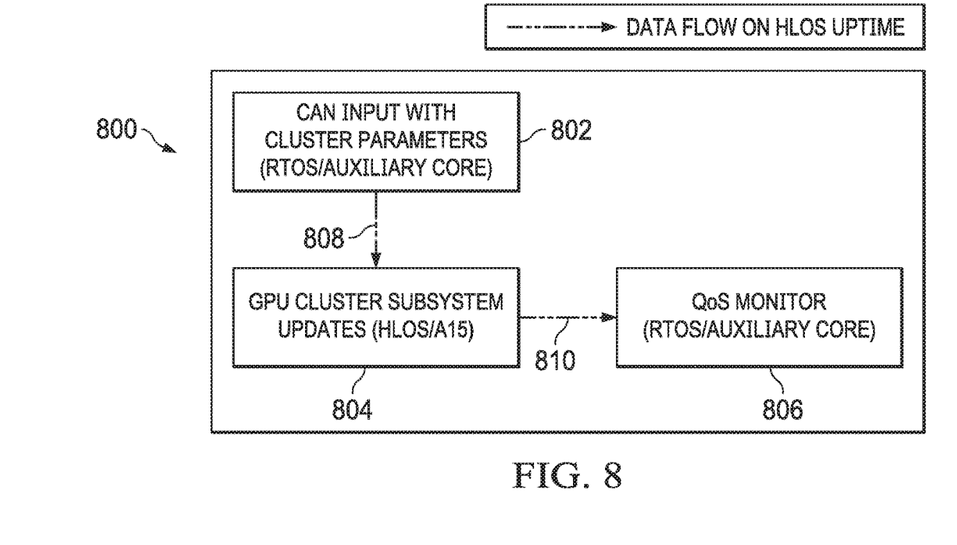
FIG. 8 is a block diagram illustrating the servicing of the GPU cluster subsystem as a parameter data rendering client.

FIG. 8 is an example block diagram 800 illustrating the servicing of the GPU cluster subsystem as a 3D rendering client. FIG. 8, similar to FIG. 1, also shows how the GPU cluster subsystem is isolated from safety elements. In operation, the CAN input 802 with cluster parameters sends a request to render parameter data 808. The parameter data 808 may contain 3D content. The GPU cluster subsystem (executing the HLOS) updates its memory 804 based on the CAN input 802, processes the data for rendering of 3D content, and forwards the rendered content 810 to the QoS monitor 806. The QoS monitor 806 services the GPU cluster subsystem as a parameter data rendering client, thus enabling an architecture to run the GPU-less fallback cluster subsystem on the auxiliary core processor in isolation from the HLOS.

The system architecture may be configured so that the whole system can run without the GPU cluster subsystem in the event of an HLOS crash. The GPU cluster subsystem can operate as a client to render parameter data (e.g., 3D content) while concurrently, the rest of the system remains stable. The source input, namely the CAN 802, may be common to the fallback cluster and the GPU cluster subsystem, and the destination (the QoS monitor 806) for the cluster subsystems can be similar. In some examples, the fact that there is a completely isolated path for the GPU cluster subsystem (entirely different from the data flow path that the GPU-less fallback cluster subsystem uses and, in some examples, in no way connected to the communication data flow path of the GPU-less fallback cluster) subsystem facilitates that the fail-safe system 100 is executing and is substantially safe.

Figure 9:
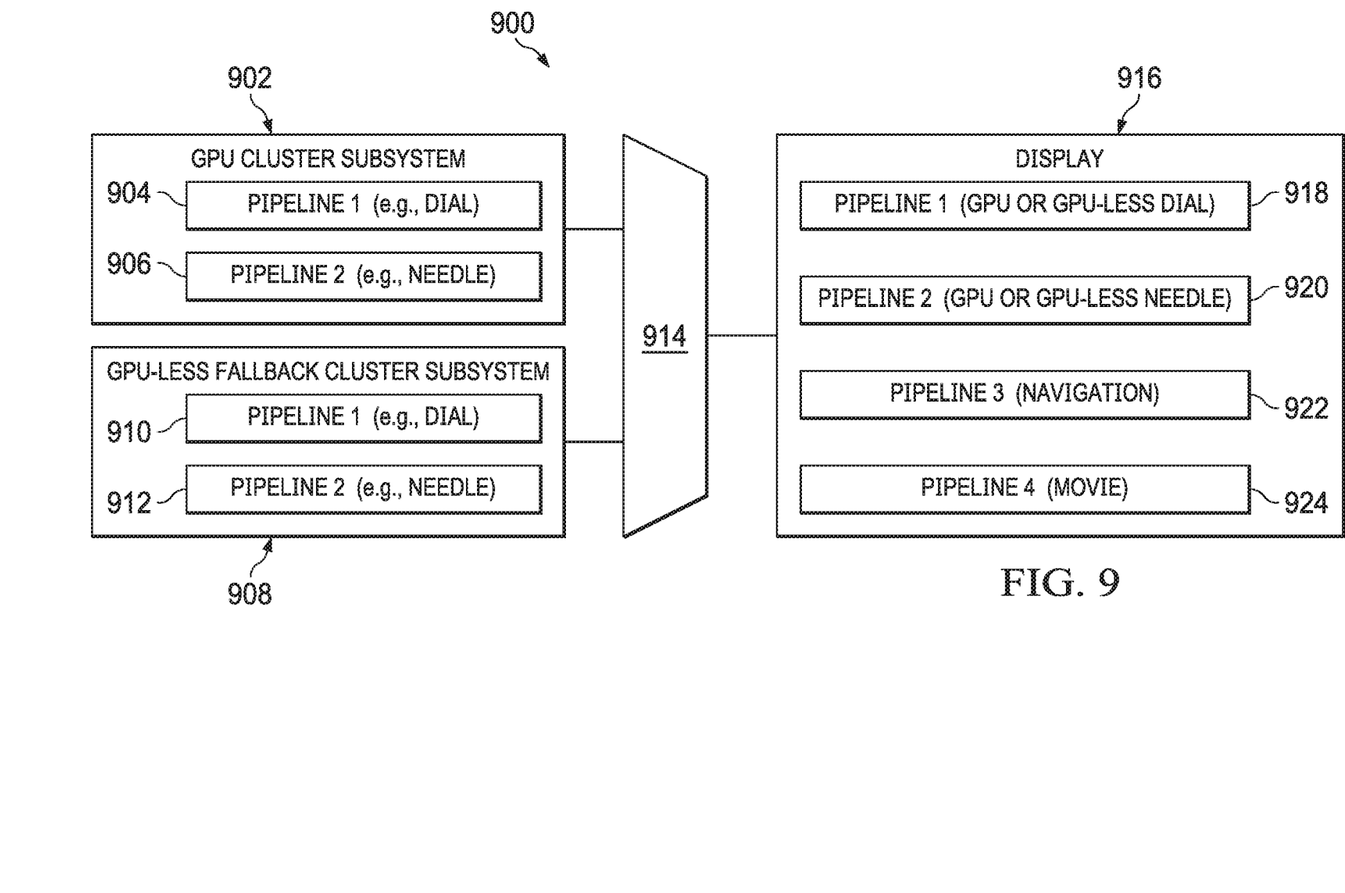
FIG. 9 is a diagram showing the multiplexing of data sources to facilitate the use of display pipeline hardware.

FIG. 9 illustrates a hardware implementation showing the multiplexing of pipelines 900. Source data from the GPU cluster subsystem 902 and the GPU-less fallback cluster subsystem 908 are multiplexed by using a number of pipelines as determined by a number of layers needed by the GPU cluster subsystem 902 and the GPU-less fallback cluster subsystem 908 to render the 3D data. In a car display, the needle may be one pipeline layer and the dial may be another pipeline layer (analogously, in a PC application example, a mouse pointer would be one pipeline layer while a word processing application would be another layer). Therefore, in the GPU cluster subsystem 902, there is at least one pipeline layer for the dial 904, and another pipeline layer for the needle 906. Likewise, in the GPU-less fallback cluster subsystem 908, there is a pipeline layer for the dials 910, and another pipeline layer for the needle 912. There are a finite amount of pipeline layers that can be posted onto the display 916 (in FIG. 9, there are 4 (or other number) pipeline layers, namely pipeline layer 918, pipeline layer 920, pipeline layer 922, and pipeline layer 924). If two pipeline layers are used for the GPU cluster subsystem 902 and the GPU-less fallback cluster subsystem 908 (namely pipeline 1 918 and pipeline 2 920) for example, because one cluster is executing at a given point in time, then the other layers, pipeline 3 922 and pipeline 4 924, are freed up for other application (e.g., navigation or a movie) to use.

A multiplexer 914 implements the switching between the GPU cluster subsystem 902 and the GPU-less fallback cluster subsystem 908. The multiplexing is useful because the number of pipelines for the display is limited and the display can be concurrently used by other applications. The display therefore multiplexes the pipelines to retrieve data from either the GPU cluster subsystem 902 or the GPU-less fallback cluster subsystem 908. So assuming that the GPU cluster subsystem 902 comprises two layers, and the GPU-less fallback cluster subsystem 908 also comprises two layers, where two layers are employed (e.g., pipeline layer 918 and pipeline layer 920) rather than four layers (e.g., pipeline layer 918, pipeline layer 920, pipeline layer 922, and pipeline layer 924). At a given point of time, the system can use the GPU cluster subsystem 902, which draws onto a canvas, or the GPU-less fallback cluster subsystem, which also draws onto a canvas. The canvas ultimately is provided to the display, which also has its own canvas. Four (or more) canvases of data (e.g., 904, 906, 910, and 912) are multiplexed at 914 to retrieve data from the GPU cluster subsystem 902 or the GPU-less fallback cluster subsystem 908. Therefore more room is provided to other applications that use the display concurrently (navigation and movie) on display 916.

Figure 10:
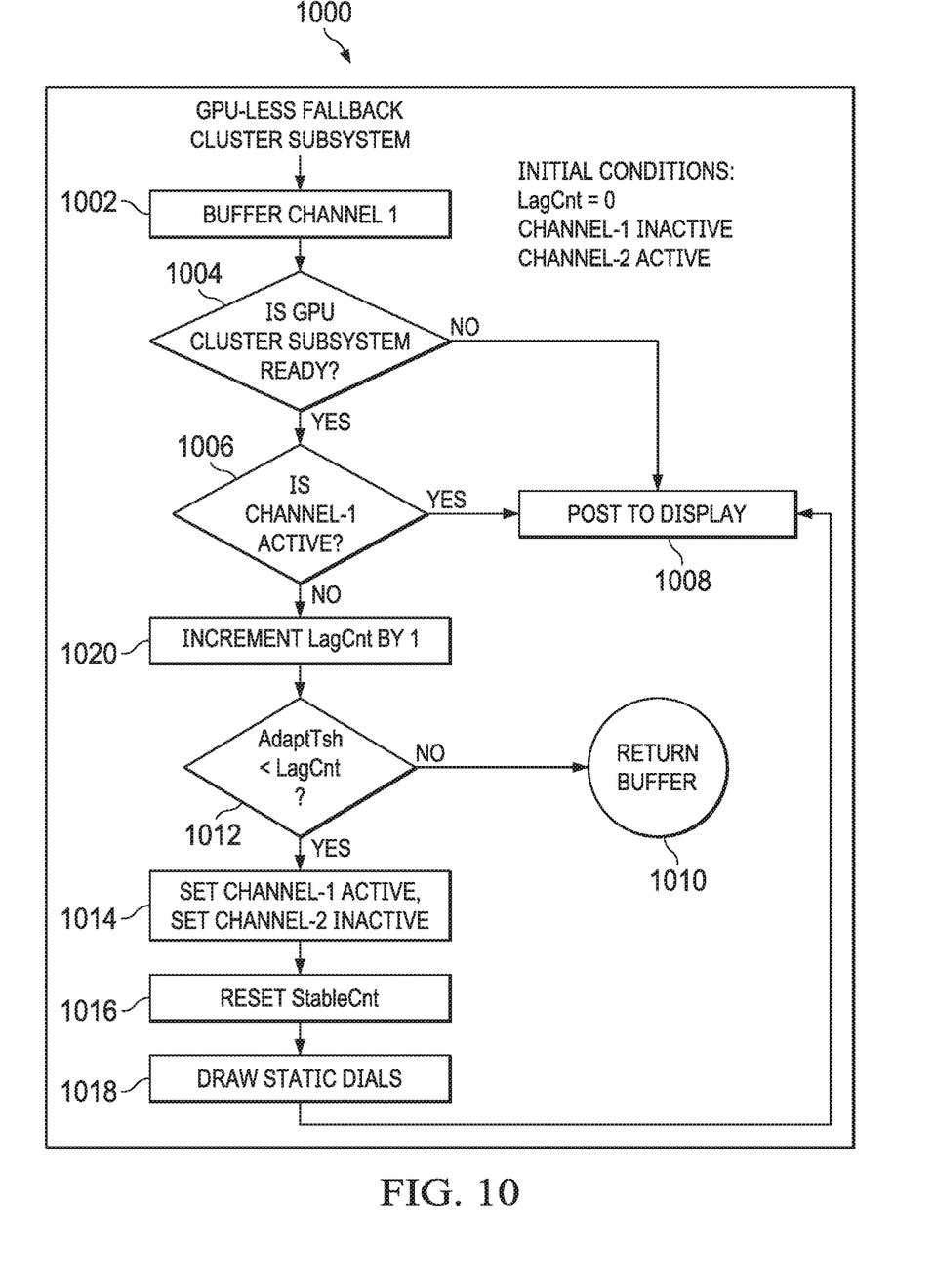
FIG. 10 is an example flow diagram showing how the QoS monitor processes GPU-less fallback cluster subsystem buffer updates.

FIG. 10 is an example flow diagram 1000 showing how the QoS monitor processes buffer updates from the GPU-less fallback cluster subsystem. As shown in FIG. 10, the initial conditions are that the lag count ("LagCnt") is set to 0, channel-1 is inactive and channel-2 is active. Channel-1 corresponds to the GPU-less fallback cluster subsystem, and channel-2 corresponds to the GPU cluster subsystem. As the initial conditions are that channel-2 is active, the GPU cluster subsystem's buffers are being used to display the digital instrument cluster parameters. At 1002, the GPU-less fallback cluster subsystem sends a buffer to the QoS monitor. At 1004, the flow determines if the GPU cluster subsystem's buffers are ready (e.g., available) to be displayed. If the GPU cluster subsystem's buffers are not ready or available to be displayed (e.g. "NO" at 1004), then at 1008, the GPU-less fallback cluster subsystem's buffers are posted to the display. If however the GPU cluster subsystem's buffers are ready to be displayed (e.g., "YES" at 1004), then at 1006, the flow determines whether channel-1 is active. If channel-1 is active, then at 1008 the fallback cluster's buffers are posted to the display. However, the initial conditions are that channel-1 is inactive. Thus, at 1006, as channel-1 is determined to be inactive (e.g., "NO" at 1006), at 1020, the lag count is incremented by 1. At 1012, it is determined whether the lag count exceeds the adaptive lag threshold. If the determination at 1012 is negative (e.g., "NO"), then at 1010, the GPU-less fallback cluster subsystem's buffer that was sent at 1002 is discarded (corresponding to "RETURN BUFFER"). If however the determination at 1012 is positive (e.g., "YES"), then at 1014, channel-1 is set to active (e.g., to switch to the GPU-less fallback cluster subsystem), and channel-2 is set to inactive (e.g., to switch from the GPU cluster subsystem). For example, the determination at 1012 would be positive when the GPU-less fallback cluster subsystem is sending buffers while the GPU cluster subsystem is not sending buffers (indicating that the GPU cluster subsystem is lagging). At 1015, the stability count is reset to 0. The stability count is set to 0 because the GPU cluster subsystem will not be used again to display the GPU cluster subsystem's buffers until the stability count exceeds a stability threshold (e.g., refer to reference number 1216 in FIG. 12). At 1018, static dials are drawn using the GPU-less fallback cluster subsystem's buffers, and then at 1008, the GPU-less fallback cluster subsystem's buffers are posted to the display.

Figure 11:
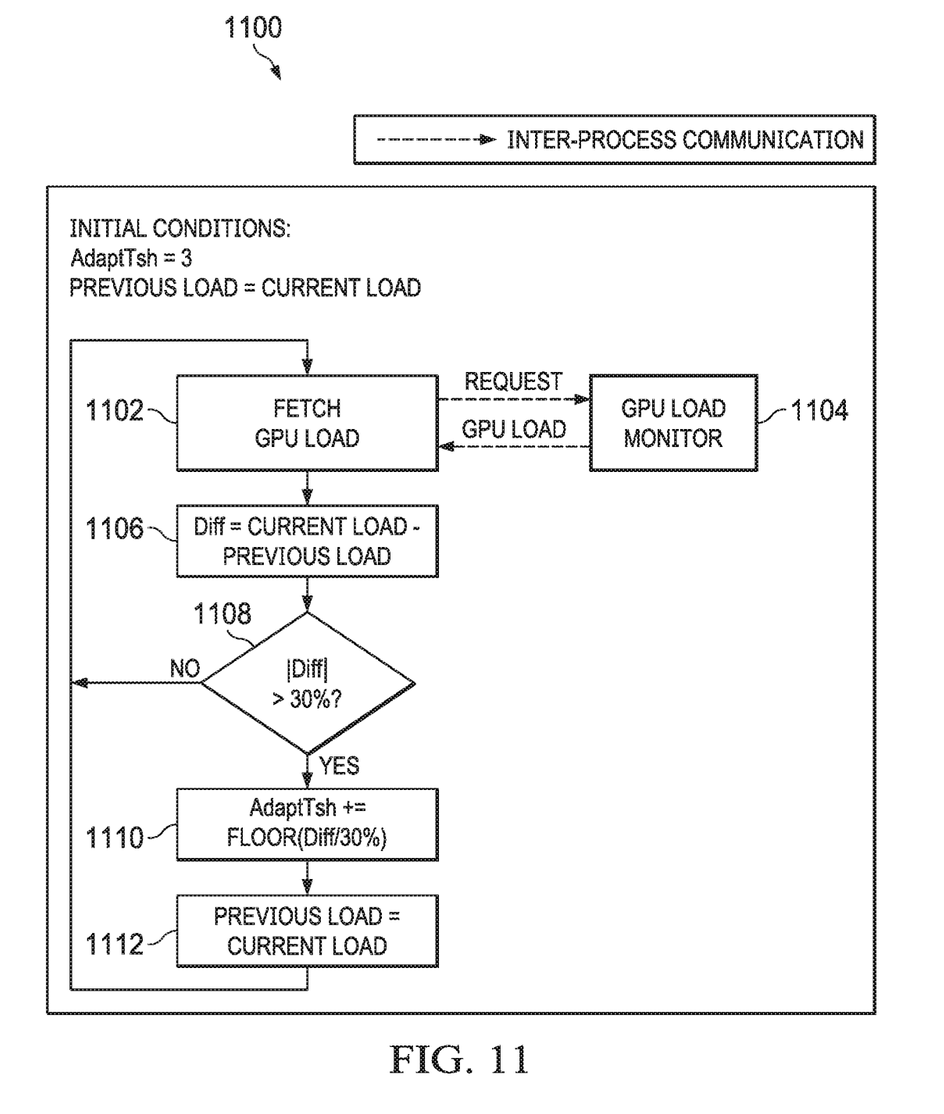
FIG. 11 is an example flow diagram showing an example method for dynamically updating an adaptive lag threshold.

FIG. 11 is a flow diagram showing an example of how the adaptive lag threshold is dynamically updated based on the load of the GPU cluster subsystem. Another module within the QoS monitor executes the flow shown in FIG. 11 asynchronously relative to the modules within the QoS monitor that execute FIG. 10 (to process buffers from the GPU-less fallback cluster subsystem) and FIG. 12 (to process buffers from the GPU cluster subsystem). In some examples, the method shown in FIG. 11 is implemented by a QoS monitor, such as QoS monitor 108 shown in FIG. 1. In the example shown by FIG. 11, the initial conditions are that the adaptive lag threshold is set to 3, and the previous load is equal to the current load. At 1102, the load of the GPU cluster subsystem is fetched, by sending a request via an interprocess communication to a GPU cluster subsystem load monitor. The GPU cluster subsystem load monitor is in some examples implemented as a module within the QoS monitor. After receiving the request for the GPU cluster subsystem's load, the GPU load monitor at 1104 provides the GPU load to the module that requested the load. At 1106, the difference between the current load and the previous load is determined. At 1108, it is determined if the absolute value of the difference between the current load and the previous load is greater than 30%. In the example shown in FIG. 11, the threshold used for comparing the difference is 30%, but the threshold is configurable. At 1108, if the difference is not greater than 30% (e.g., "NO"), then the adaptive lag threshold is not dynamically updated and the method returns to 1102. If however the difference is greater than 30% (e.g., "YES" at 1108), then at 1110, the adaptive lag threshold is updated to be the current value of the adaptive lag threshold plus the floor of the difference divided by 30%). In a concrete example, assume that the current value of the adaptive lag threshold is 3. Further assume that the previous load of the GPU cluster is 5%, and the current load is 95%. In this case, then the difference is calculated to be 95%-5%, or 90%. 90% divided by 30% is 3, so the adaptive lag threshold is set to be 3+3, or 6. Since the adaptive lag threshold is now 6 rather than 3, more GPU-less fallback subsystem's buffers are needed to trigger a positive determination (e.g., "YES") at 1012 in FIG. 10 such that a switch from the GPU cluster subsystem to the GPU-less fallback cluster subsystem will not happen unnecessarily and in a way that would otherwise be alarming and distracting to the user of the of the failsafe application (e.g., the driver of the car). At 1112, the previous load is set to be the current load (e.g., the previous load is set to 95%) and the flow returns to 1102.

Figure 12:
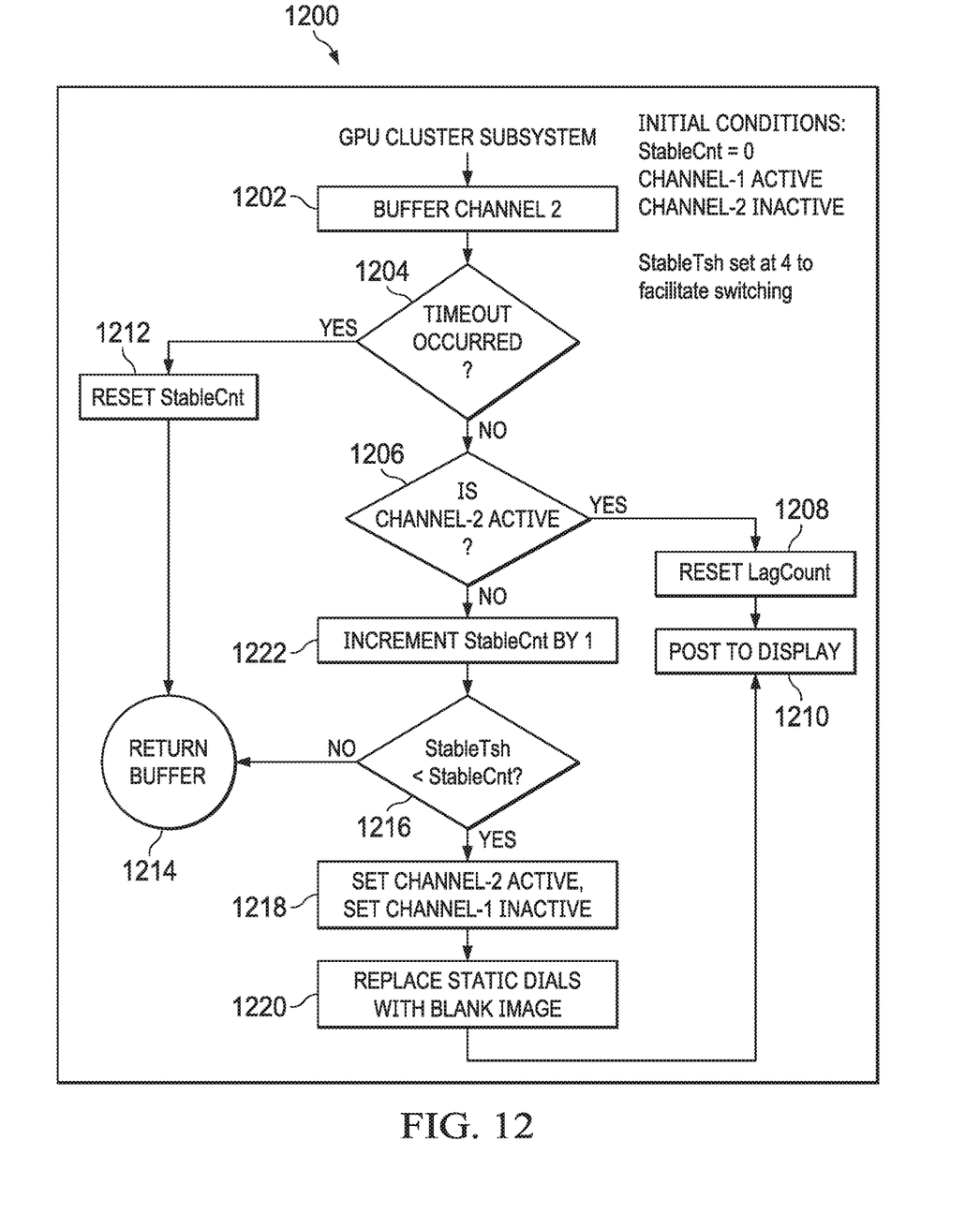
FIG. 12 is an example flow diagram showing how the QoS monitor processes GPU cluster subsystem buffer updates.

FIG. 12 is a flow diagram 1200 showing how the QoS monitor processes the GPU cluster subsystem's buffer updates. In the example shown in FIG. 12, the initial conditions are that the stability count ("StableCnt") is set to 0, the stability threshold is set to 4 (the stability threshold is in some examples determined experimentally, and like the adaptive lag threshold, is configurable and adaptable), channel-1 is active and channel-2 is active. Channel-1 corresponds to the GPU-less fallback cluster subsystem, and channel-2 corresponds to the GPU cluster subsystem. Thus, in FIG. 12, the initial conditions are that the GPU-less fallback cluster subsystem's buffers are being used to display the cluster application's parameter data. At 1202, the GPU cluster subsystem sends its buffer to the QoS monitor (e.g., the QoS monitor 108 of FIG. 1). At 1204, a determination is made as to whether a timeout occurred (e.g., determining whether the GPU cluster subsystem's buffers are stale). For example, if the GPU cluster subsystem's buffer has a timestamp of 12:00 AM, but the GPU cluster's buffer is not received by the QoS monitor until 12:05 AM, then in one example the determination at 1204 would be positive because a five minute delay would represent a timeout. The amount of time that has passed in determining whether timeout has occurred is configurable. Thus, at 1204, if the determination is positive (e.g., "YES"), the stability count is reset to 0, indicating that the GPU cluster subsystem is not operating satisfactorily, and the GPU cluster subsystem's buffer is discarded ("RETURN BUFFER") at 1214. If however no timeout has occurred, the determination at 1204 is negative (e.g., "NO"), and the method proceeds to 1206. At 1206, it is determined whether channel-2 is active (whether the GPU cluster subsystem is active). If the determination at 1206 is positive (e.g., "YES"), then at 1208 the lag count is reset to 0 and then at 1210, the GPU cluster subsystem's buffer is posted to the display (e.g., the GPU cluster subsystem's buffer is used to display the parameters of the cluster application). If however the determination at 1206 is negative (e.g., "NO"), then the method proceeds to 1222. The initial conditions are that channel-2 is inactive, so initially, the determination at 1206 will be negative. At 1222, the stability count is incremented by 1 (e.g., set to 1 from being initially 0). At 1216, it is determined whether the stability count is greater than the stability threshold. If the determination at 1216 is negative (e.g., "NO"), because it is not yet safe to switch to the GPU cluster subsystem, then the GPU cluster subsystem's buffer is discarded at 1214. If however the determination at 1216 is positive (e.g., "YES"), because it is now safe to switch to the GPU cluster subsystem, then at 1218, channel-2 is set to active (e.g., to switch to the GPU cluster subsystem), and channel-1 is set to inactive (e.g., to switch from the GPU-less fallback cluster subsystem). The determination at 1216 would be positive when a sufficient number of buffers from the GPU cluster subsystem have been received. At 1220, static dials are replaced with a blank image. From 1220, the method proceeds to 1210 to post the GPU cluster subsystem's buffers to the display.

What have been described above are examples of the disclosure. It is not possible to describe the conceivable combination of components or method for purposes of describing the disclosure, but one will understand that many further combinations and permutations of the disclosure are possible. Accordingly, the disclosure is intended to embrace all such alterations, modifications, and variations that fall within the scope of this application, including the appended claims.

What is claimed is:

1. A system comprising:
a first processing resource that includes a first network interface and is operable to:
receive a first set of data via the first network interface;
render a first image for display based on the first set of data;
a second processing resource that includes a second network interface and is operable to:
receive a second set of data via the second network interface;
render a second image for display based on the second set of data;
a switch coupled to the first processing resource and the second processing resource and operable to couple to a display, wherein the switch is operable to:
select an image from between the first image and the second image based on a quality of service (QoS) metric that is based on at least one of: a load measurement, a lag measurement, or a stability measurement of the first processing resource; and
provide the selected image to the display.

2. The system of claim 1, wherein:
the second processing resource is operable to:
determine a set of values for a set of local variables;
render the second image based on the set of values; and
provide the set of values to the first processing resource; and
the first processing resource is operable to render the first image based on the set of values provided by the second processing resource.

3. The system of claim 1, wherein the switch is operable to:
determine the load measurement of the first processing resource;
select a lag threshold based on the load measurement;
determine the lag measurement of the first processing resource;
compare the lag measurement to the lag threshold; and select the image from between the first image and the second image based on the comparison of the lag measurement to the lag threshold.

4. The system of claim 3, wherein the switch is operable to select the lag threshold based on the load measurement such that an increase in the load measurement corresponds to an increase in the lag threshold.

5. The system of claim 3, wherein the switch is operable to determine the load measurement of the first processing resource by sending a ping to the first processing resource.

6. The system of claim 3, wherein the switch is operable to determine the load measurement of the first processing resource by reading a register of the first processing resource.

7. The system of claim 1, wherein the switch is operable to:
determine the stability measurement of the first processing resource;
compare the stability measurement to a stability threshold; and
select the image from between the first image and the second image based on the comparison of the stability measurement to the stability threshold.

8. The system of claim 1, wherein the first network interface of the first processing resource and the second network interface of the second processing resource are both operable to couple to a network data source such that the network data source provides the first set of data to the first network interface of the first processing resource and provides the second network interface of the second set of data to the second processing resource.

9. The system of claim 8, wherein each of the first network interface of the first processing resource and the second network interface of the second processing resource is a respective controller area network (CAN) interface operable to couple to the network data source.

10. The system of claim 1, wherein:
the first processing resource includes a graphics processing unit (GPU); and
the second processing resource does not include a GPU.

11. The system of claim 1, wherein:
the first processing resource includes a primary core of a system on a chip; and
the second processing resource includes an auxiliary core of the system on a chip.

12. The system of claim 1, wherein:
the first processing resource is operable to execute a high level operating system; and
the second processing resource is operable to execute a real-time operating system.

13. A system on a chip (SoC), comprising:
a first processing resource that includes a primary core and a first controller area network interface and is operable to:
receive a first set of parameter data via the first controller area network interface; and
render a first image for display based on the first set of parameter data;
a second processing resource that includes an auxiliary core and a second controller area network interface and is operable to:
receive a second set of parameter data via the second controller area network interface; and
render a second image for display based on the second set of parameter data; and
a quality of service (QoS) switch coupled to the first processing resource and the second processing resource and operable to select between the first processing resource and the second processing resource for display.

14. The SoC of claim 13, wherein:
the second processing resource is operable to:
determine a set of values for a set of local variables based on the second set of parameter data;
render the second image based on the set of values; and
provide the set of values to the first processing resource; and
the first processing resource is operable to render the first image based on the set of values provided by the second processing resource.

15. The SoC of claim 13, wherein the QoS switch is operable to select between the first processing resource and the second processing resource for display based on at least one of a load measurement, a lag measurement, or a stability measurement of the first processing resource.

16. The SoC of claim 13, wherein the QoS switch is operable to:
determine a load measurement of the first processing resource;
select a lag threshold based on the load measurement;
determine a lag measurement of the first processing resource;
compare the lag measurement to the lag threshold; and
select between the first processing resource and the second processing resource for display based on the comparison of the lag measurement to the lag threshold.

17. The SoC of claim 16, wherein the QoS switch is operable to determine the load measurement of the first processing resource by sending a ping to the first processing resource.

18. The SoC of claim 16, wherein the QoS switch is operable to determine the load measurement of the first processing resource by reading a register of the first processing resource.

19. The SoC of claim 13, wherein the QoS switch is operable to:
determine a stability measurement of the first processing resource;
compare the stability measurement to a stability threshold; and
select between the first processing resource and the second processing resource for display based on the comparison of the stability measurement to the stability threshold.

20. The SoC of claim 13, wherein:
the first processing resource includes a graphics processing unit (GPU); and the second processing resource does not include a GPU.

* * * * *